G. W. BENAGE.
NOSE GUARD FOR CATTLE.
APPLICATION FILED AUG. 22, 1911.
1,051,064.
Patented Jan. 21, 1913.
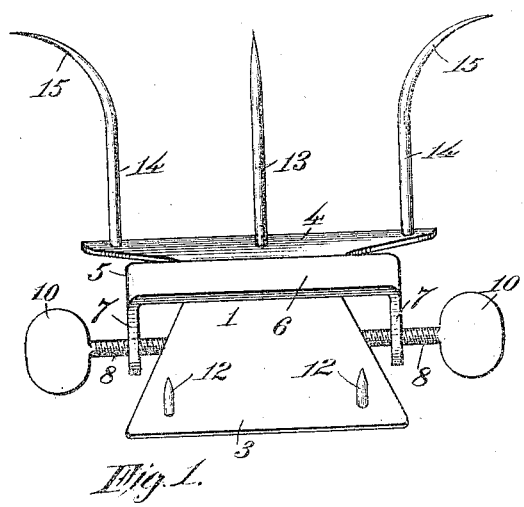
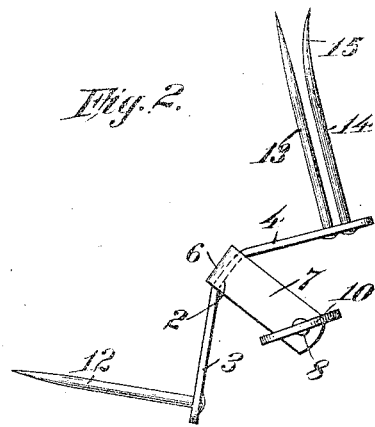
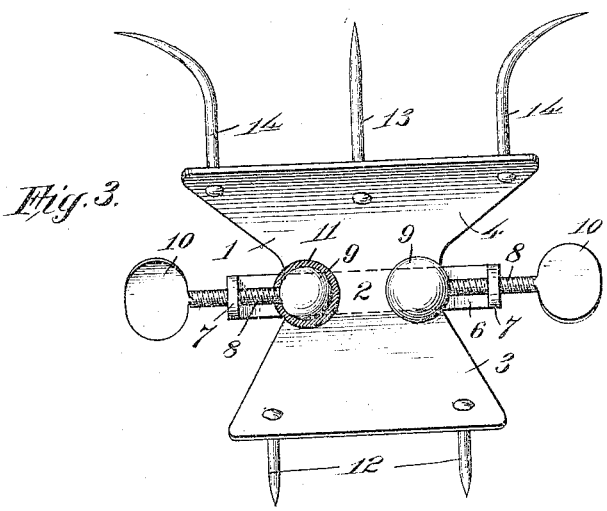
Inventor
George W. Benage
Witnesses
By Joshua R. H. Potts
Attorney

UNITED STATES PATENT OFFICE.

GEORGE W. BENAGE, OF JUDA, WISCONSIN.

NOSE-GUARD FOR CATTLE.

1,051,064.

Specification of Letters Patent. Patented Jan. 21, 1913.

Application filed August 22, 1911. Serial No. 645,460.

*To all whom it may concern:*

Be it known that I, GEORGE W. BENAGE, a citizen of the United States, residing at Juda, county of Green, and State of Wisconsin, have invented certain new and useful Improvements in Nose-Guards for Cattle, of which the following is a specification.

My invention relates to devices used for weaning calves and for preventing cows from sucking themselves.

The object of my invention is to provide a device of the class mentioned which may be securely attached to an animal's nose and which, when in position, will effectually prevent an animal from sucking its own teat or that of another.

A further object of my invention is to provide a device as mentioned which shall not interfere with the animal grazing or obstruct its breathing.

Other objects will appear hereinafter.

With these objects in view my invention consists generally in a plate bent transversely at about the center to form two angularly disposed portions adapted to lie against or substantially conform to the end and to the forward upper portion respectively, of the nose of the animal, a clamping device secured to the central portion of the plate whereby either of the angularly disposed portions may be arranged uppermost, and a set of prongs projecting from each of the said portions of the plate.

My invention further consists in certain construction and arrangement of the prongs whereby the two sets are particularly adapted to the special use for which they are intended.

My invention further consists in a device as above mentioned and further characterized by having the parts so proportioned and arranged that when the device is secured in position it shall lie entirely above the mouth so as not to interfere with the animal grazing, and in which the plate is reduced in width at the center to better accommodate the fastening means and to avoid interfering with the breathing of the animal.

My invention further consists in various details of construction and arrangements of parts all as will be fully described hereinafter and particularly pointed out in the claim.

My invention will be more readily understood by reference to the accompanying drawings forming a part of this specification and in which, Figure 1 is a front elevation of a weaning device embodying my invention in its preferred form, Fig. 2 is a side elevation thereof, and Fig. 3 is a rear view.

Referring to the drawings, 1 indicates a plate, preferably of metal, bent transversely as at 2 to form a pair of angularly disposed portions 3 and 4. These are disposed at such an angle to each other that they are adapted to conform substantially to the end and to the forward upper portion of the animal's nose when in position thereon. The plate is contracted in width or narrowed at the bend, which is preferably about the center of the device, to permit the animal to breathe freely, and is flared or widened toward the ends.

Secured to the central narrowed portion of the plate, preferably at the bend 2, is a clamp 5 for securing the device to the animal's nose. This comprises a transverse bar 6 fixed to the plate and having its ends turned inwardly at right angles forming a pair of ears 7—7, and a pair of screws 8—8 threaded through the ears and provided with well rounded knobs 9 on their inner ends to engage the nose between the nostrils. The bar 6 and ears 7 embrace the plate 1 at its narrowest part and the ears 7 substantially bisect the angle between the portions 3 and 4, whereby the device will be held in proper position with whichever portion 3 or 4 uppermost as desired. The screws 8 are preferably provided with flattened thumb pieces 10 and the knobs 9 are preferably covered with a rubber casing 11 to avoid injury to the animal's nose and make the device more comfortable to wear.

Projecting at right angles from the portion 3 of the plate and near its outer end, are two prongs 12; and projecting from the portion 4 near its outer edge is a straight central prong 13 and a pair of side prongs 14, the latter curving outwardly at the ends, as at 15. When the device is to be used in weaning calves the portion 3 is placed lowermost, or in the position shown in the drawings. The prongs 14 will prevent the cow from drawing its teat into its mouth and also prevent it getting close enough to that of others to suck them.

Having described my invention what I claim as new and desire to secure by Letters Patent is:—

In a device of the class described, a plate reduced in width at the center and bent transversely to form two angularly disposed flat portions, a set of prongs projecting from each of said portions, and a clamping device comprising a transverse bar secured to said plate at substantially the bend thereof, a pair of inturned ends on said bar extending inwardly at said reduced portion and substantially bisecting the angle between the two portions of the plate and clamping screws threaded through said ends, substantially as described.

In testimony whereof I have signed my name to this specification in the presence of two subscribing witnesses.

GEORGE W. BENAGE.

Witnesses:
WM. DUNWIDDIE,
MATTIE M. MATZKE.